United States Patent [19]

Benson et al.

[11] Patent Number: 5,709,418

[45] Date of Patent: Jan. 20, 1998

[54] PIPE FITTING WITH COUPLING BODY AND SWAGE RING WITH KICKDOWN DEVICE TO PREVENT REDUCTION IN SEALING TOOTH CONTACT FORCE

[75] Inventors: Robert W. Benson, San Carlos; Melvin C. Biersteker, Portola Valley; Andy Song, South San Francisco, all of Calif.

[73] Assignee: Lokring Corporation, Foster City, Calif.

[21] Appl. No.: 406,551

[22] Filed: Mar. 20, 1995

[51] Int. Cl.⁶ ............................................. F16L 13/14
[52] U.S. Cl. .............................. 285/382.2; 285/417
[58] Field of Search ........................ 285/382.2, 417, 285/382

[56] References Cited

U.S. PATENT DOCUMENTS

| | | | |
|---|---|---|---|
| 2,613,959 | 10/1952 | Richardson | 285/382.2 X |
| 2,816,781 | 12/1957 | Woodling | 285/149 |
| 3,262,721 | 7/1966 | Knight | 285/174 |
| 3,498,648 | 3/1970 | Hallesy | 285/343 |
| 3,827,727 | 8/1974 | Moebius | 285/27 |
| 3,889,989 | 6/1975 | Legris | 285/341 |
| 3,893,720 | 7/1975 | Moebius | 285/187 |
| 3,997,195 | 12/1976 | Bartholomew | 285/81 |
| 4,061,367 | 12/1977 | Moebius | 285/382.2 |
| 4,183,560 | 1/1980 | Wyss | 285/232 |
| 4,470,575 | 9/1984 | Stoll | 251/149 |
| 4,482,174 | 11/1984 | Puri | 285/382.2 |
| 4,705,302 | 11/1987 | Beiley | 285/47 |
| 4,903,995 | 2/1990 | Blenkush et al. | 285/38 |
| 5,110,163 | 5/1992 | Benson et al. | 285/382.2 |
| 5,114,191 | 5/1992 | Sareshwaia | 285/382.2 X |
| 5,181,752 | 1/1993 | Benson et al. | 285/81 |

FOREIGN PATENT DOCUMENTS

2401505 A1  7/1975  Germany.

*Primary Examiner*—Dave W. Arola
*Attorney, Agent, or Firm*—Fliesler, Dubb, Meyer & Lovejoy

[57] ABSTRACT

A pipe coupling includes a coupling body 50 and swage ring 52 for urging over the coupling body 50 in order to secure pipes 108 together. The coupling body 50 includes a first main sealing tooth 50 and a second outboard sealing tooth 56. The swage ring 52 includes a kickdown device 101 which restores a loading force between the first main sealing tooth 50 and the pipe 108, which loading force may have been reduced due to sequential tooth engagement and pipe radial deformation.

17 Claims, 8 Drawing Sheets

PIPE FITTING WITH COUPLING BODY AND SWAGE RING WITH KICKDOWN DEVICE TO PREVENT REDUCTION IN SEALING TOOTH CONTACT FORCE

FIELD OF THE INVENTION

The present invention is directed to a pipe fitting which allows pipes to be joined and sealed together using a mechanical fitting.

BACKGROUND OF THE INVENTION

Mechanically attached fittings such as the pipe fittings described in U.S. Pat. Nos. 4,482,174, 5,110,163, and 5,114, 191, which patents are incorporated herein by reference, are designed so that the sealing elements or sealing teeth sequentially engage the pipe upon which the fitting is being installed. Such sequential engagement reduces the installation force required to move the swage ring from the outboard position to the fully installed inboard position. This is due to the installation tool only being required to provide enough force to do the work necessary to cause deformation and thus sealing engagement with the pipe at one sealing tooth location at a time. Performing the pipe fitting installation at two or more sealing teeth locations simultaneously would require more force as more work would have to be done per increment of travel of the swage ring.

The above installation process causes the sealing tooth or teeth of the pipe fitting to engage the pipe, thus forming a leak tight mechanical joint between the pipe and fitting. This engagement of the sealing teeth of the fitting with the pipe causes the pipe to be deformed radially inwardly, with the coupling body of the pipe fitting located externally about the pipe. In a situation where the pipe is located externally to the coupling body, the pipe would also preferably be deformed radially inwardly.

It is possible that the sealing ability of the pipe fitting may be diminished as a consequence of the above two factors: (1) sequential tooth engagement and (2) pipe radial deformation. In the embodiment of FIG. 1, the pipe fitting has a coupling body 20 which includes a first main sealing tooth 22 and a second outboard sealing tooth 24. It has been understood that FIG. 1 is only a partial cross-sectional view of the coupling body 20. The coupling body 20 is a cylindrical structure as is shown in the prior patents with the sealing teeth located in this embodiment on the interior surface 26. The coupling body 20 has an exterior surface 28 which includes one or more projections such as projection 30 which can be engaged by the swage ring 32 (FIG. 2) for causing the pipe fitting to seal about a pipe. The rotation of the cross-sectional portion of the coupling body 20 about the axis of rotation 34 describe approximately half of a coupling body used to couple together two pipes. The other half of the coupling body would be a mirror image of the previous half, located on the other side of axis 36. Similarly, the swage ring is formed through the rotation of a cross-sectional portion of the swage ring 32 about axis of rotation 40. As is evident from a review of the above patents, more than the first and second sealing teeth can be incorporated into the coupling body 20.

As indicated above, the sealing ability of the pipe can be diminished by sequential tooth engagement and pipe radial deformation. The engagement of one or more sealing teeth such as, by way of example only, the second outboard sealing tooth 24, subsequent to the engagement of the first main sealing tooth 22 and the attendant deformation of the pipe caused by the subsequent engagement, may reduce the loading force between the first main sealing tooth 22 and the pipe, which loading force results with the swage ring 32 being urged over the coupling body 20. This loading force reduction due to the subsequent engagement of the second sealing tooth 24 results from the pipe 38 being pushed away from the first main sealing tooth 22. In an extreme case this may result in a gap 39 being formed between the first main sealing tooth and the pipe as can be seen in FIG. 3. Gap 39 may thus be formed with the full installation of the swage ring 32 over the coupling body 20. This reduction of the force between the first main sealing tooth 22 and the pipe 38 may diminish the effectiveness of the seal between the first main sealing tooth and the pipe 38, particularly under the influence of applied mechanical load such as bending and torsion.

Accordingly the issue to be addressed is that of obtaining the benefit of sequential engagement of the sealing teeth while reducing or eliminating any associate reduction of load force between the pipe and sealing teeth on the sealing teeth that were engaged early in the engagement sequence.

SUMMARY OF THE INVENTION

The present invention provides for a pipe fitting with an advantageously improved swage ring.

The problem previously described can be eliminated by a kickdown device to restore a loading force between the main sealing tooth and the pipe. The kickdown device reseats the main sealing tooth on the pipe. In a preferred embodiment the feature is added to the interior surface of the swage ring which acts on the first main sealing tooth. This kickdown device or feature has the form of a slight decrease in the internal diameter of the interior surface of the swage ring. The device is positioned along the axis of the swage ring in such a manner that it will be adjacent to the first main sealing teeth location when the swage ring is in the fully installed position. This kickdown device of the swage ring is the last portion of the interior surface of the swage ring to contact the exterior surface of the coupling body adjacent to the first main sealing tooth with the swage ring fully installed on the coupling body. This contact between the swage ring kickdown feature and the exterior surface of the coupling body which is adjacent to the main sealing tooth causes an additional amount of inward radial deformation on the coupling body, and thus consequently of the first main sealing tooth. This amount of additional inward radial deformation causes the normal loading between the first main sealing tooth and the pipe to be increased. This increase in the normal force between the first main sealing tooth and the pipe compensates for any reduction in normal force caused by the sequential engagement of the second or other sealing tooth and the pipe.

The amount of additional deformation provided by the kickdown device may be small in comparison to the deformation which occurs when the first main sealing tooth initially engages the pipe. Consequently, the second deformation of the first main sealing tooth is not sufficiently large to cause a reduction in the force between the second or subsequent sealing tooth and the pipe at those sealing locations that are engaged subsequent to the initial engagement of the first main sealing tooth. A further consequence of making the deformation caused by the kickdown feature of the swage ring small compared to the original deformation of the first main sealing tooth, is that the additional amount of installation force applied to the swage ring will be small when compared to the actual force required to effect the initial deformation of the first main sealing tooth. This force is of course applied using a tool such as the hydraulic tool described in U.S. Pat. No. 5,305,510. This patent is incorporated herein by reference. As this is the case, such a kickdown feature or device allows the deformation of the first sealing tooth, caused by the swage ring kickdown device, to occur either simultaneously with, or subsequent to, the engagement of the second sealing tooth with little or no increase in installation force.

It is to be understood that the present invention is not limited to fittings that have only a first main sealing tooth and a subsequent sealing tooth. The concept can be applied to fittings with any number of sealing teeth that engage a pipe sequentially. Typically, the number of sealing teeth on a particular fitting into which the kickdown device can be applied is one less than the total number of sealing teeth on the fitting end.

In accordance with the advantages of the present invention, an apparatus of the present invention for making pipe connections comprises a coupling body with a first surface adapted for receiving a pipe and a swage ring which is adapted for being urgeable relative to the coupling body in order to cause at least part of the first surface to engage the pipe to create a seal. The first surface of the coupling body has a first tooth for substantially biting into the pipe as a swage ring is urged relative to the pipe. The first surface has a second tooth for making at least a minimal bite into the pipe as the swage ring is urged relative to the pipe. The swage ring has a first portion for causing the first tooth to bite into the pipe and a second portion for causing the second tooth to bite into the pipe, wherein the first portion is spaced from the second portion so that the second tooth bites into the pipe subsequent to when the first tooth bites into the pipe. The swage ring further includes at least a third portion for causing the first tooth to additionally bite into the pipe, one of (1) substantially simultaneously with the biting into the pipe of the second tooth or (2) subsequent to the biting into the pipe of the second tooth.

In a further aspect of the present invention, the swage ring has a longitudinal axis. The first portion of the swage ring is located further away from the longitudinal axis than the third portion of the swage ring with the third portion of the swage ring located further away from the longitudinal axis than the second portion.

In a further aspect of the present invention, the third portion of the swage ring is located between the first and the second portion in a direction along the longitudinal axis.

In another aspect of the invention, the first, second and third portions of the swage ring comprise ramps that slope downwardly in the direction away from the direction that the swage ring is urged relative to the coupling body.

In yet another aspect of the invention, the first, second and third portions of the swage ring comprise ramps with the first and second portions connected with a land and the second and third portions connected with a land.

In yet a further embodiment of the invention, a swage ring for making a pipe connection comprises a first portion adapted for operatively engaging a first sealing tooth of a coupling body and causing the first sealing tooth to bite into the pipe, and a second portion adapted for operatively engaging a second sealing tooth of a coupling body for causing the second sealing tooth to bite into the pipe. The swage ring further includes a third portion adapted for causing the first sealing tooth to place a loading force on the pipe, one of (1) substantially simultaneously with the action of the second sealing tooth in biting into the pipe, or (2) subsequent to the action of the second sealing tooth in biting into the pipe.

In yet another aspect of the invention, the swage ring includes a kickdown device for reapplying a load between a sealing tooth and a pipe, which load may have been reduced due to the engagement of subsequent sealing teeth with a pipe.

In yet another aspect of the invention, the swage ring is designed in order to eliminate a gap between the first sealing tooth and the pipe which may have been caused due to sequential engagement of other sealing teeth urging the pipe away from the first sealing tooth.

In still another aspect of the invention, a method for pipe connections comprises the steps of first causing a first tooth of a coupling body to bite into the pipe and then causing a second tooth of the coupling body to bite into the pipe. The method further includes the step of first causing the first tooth of the coupling body to again bite into the pipe one of (1) subsequently simultaneously with the biting into the pipe of the second tooth or (2) subsequently to the biting into the pipe by the second tooth.

The method thus includes the restoring of a loading force between the first tooth and the pipe.

In a further aspect of the invention, a method includes using a first installation force to implement the above first causing step, using a second installation force to implement the above second causing step, and using a third installation force to implement the above third causing step, which third installation force is less than the first installation force and which third installation force is less than the second installation force.

In yet another aspect of the invention, a method for making a pipe connection comprises first causing a first tooth of a coupling body to bite into the pipe and second and subsequently causing a second tooth of the coupling body to bite into the pipe. A third step includes restoring a load force between the first tooth and the pipe.

In yet another aspect of the invention, the above third restoring step occurs, one of (1) substantially simultaneously with the second causing step, or (2) after the second causing step.

In yet a second embodiment of the invention, the coupling body includes a first sealing tooth and a second sealing tooth, with the first sealing tooth being the main sealing tooth and the second sealing tooth being outboard of the first sealing tooth. The swage ring as a first portion for causing the first tooth to bite into the pipe and for causing the second tooth to bite into the pipe, wherein the first tooth bites into the pipe subsequent to the second tooth biting into the pipe. The swage ring further has a second portion for causing the second sealing tooth to bite into the pipe, one of (1) substantially simultaneous with the biting into the pipe by the first tooth, or (2) subsequent to the biting into the pipe by the first tooth. The second portion of the swage ring includes the swage ring kickdown feature and when the swage ring kickdown feature operatively engages the second tooth, such engagement causes an additional amount of inward radial deformation on the coupling body and thus on the second sealing tooth. This amount of additional inward radial deformation causes the loading between the second sealing tooth and the pipe to increase. This increase in force between the second sealing tooth and the pipe compensates for any reduction in force caused by the sequential engagement of the first or other sealing tooth with the pipe. The kickdown feature reseats the second sealing tooth on the pipe.

In another aspect of the invention a swage ring for making a pipe connection comprises a first portion adapted for operatively engaging a first sealing tooth of a coupling body and causing the first sealing tooth to bite into a pipe and adapted for operatively engaging a second sealing tooth of the coupling body for causing the second sealing tooth to bite into the pipe. The swage ring further includes a second portion adapted for causing the second sealing tooth to restore a load force between the second sealing tooth and the pipe. The second portion reseats the second sealing tooth on the pipe.

Still in an additional aspect of the invention, the method of making a pipe connection, with a coupling body having a first tooth and a second tooth, comprises the steps of first causing a second tooth of a coupling body to bite into a pipe, second causing a first tooth of the coupling body to bite into the pipe, and third causing the second tooth of the coupling body to again bite into the pipe, one of (1) substantially simultaneously with the biting into the pipe by the first tooth, or (2) subsequent to the biting into the pipe by the first tooth.

In yet a further aspect of the invention the method includes storing a loading force between the second tooth and the pipe and in reseating the second sealing tooth on the pipe.

It is to be understood that the objects, aspects, advantages and features of the invention which are described herein, both in the apparatus and the method can be applied separately and in the combinations suggested and fall within the spirit and scope of the invention.

Other aspects, objects, advantages and inventive concepts and features which have been developed by the present inventors can be obtained from a review of the remainder of the specification, the claims and the figures.

DETAILED DESCRIPTION OF THE PREFERRED EMBODIMENT

Figure 1:
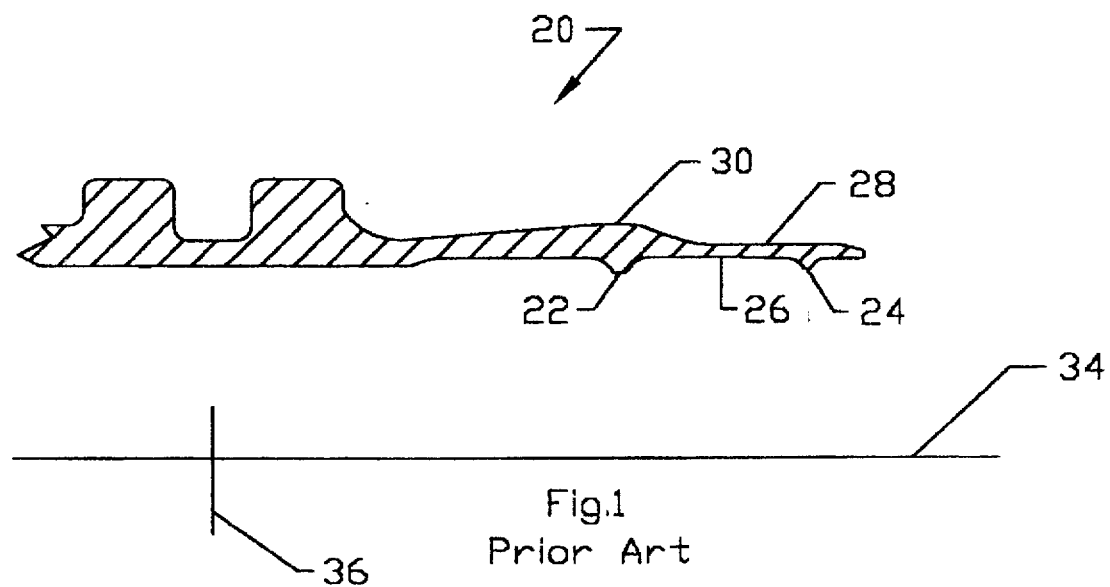
FIG. 1 is a cross-sectional view of a portion of a prior art coupling body of a pipe fitting.
Figure 2:
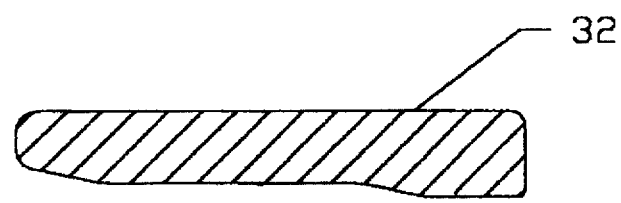
FIG. 2 is a cross-sectional view of a swage ring of a prior art pipe fitting.
Figure 4:
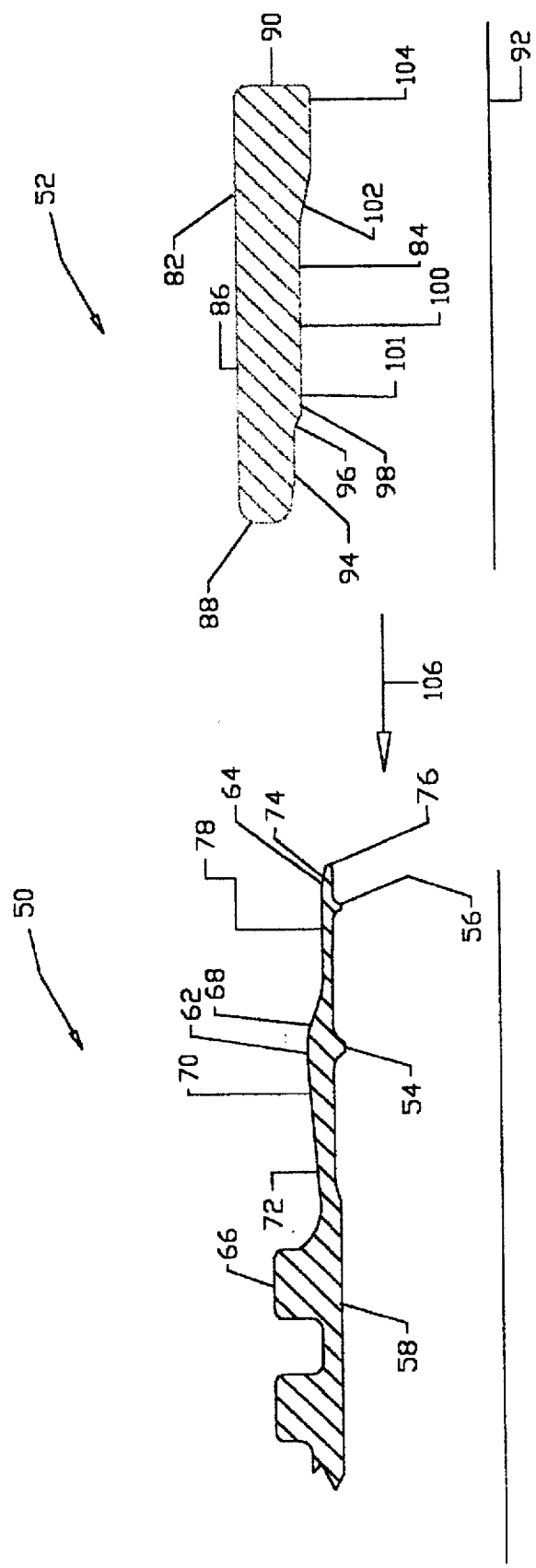
FIG. 4 is a cross-sectional view of an improved swage ring having the kickdown device of the present invention shown in combination with a cross-sectional view of a coupling body.

The preferred embodiment of the invention is shown in FIG. 4 and includes a coupling body 50 which is similar to the coupling body shown at FIG. 1 and a swage ring 52. The coupling body 50 includes a first main sealing tooth 54 and a second outboard sealing tooth 56. These teeth are located on the interior surface 58 of the coupling body 50. It is to be understood, as is shown in the above referenced prior patents, that additional teeth can be positioned on the interior surface 58 outboard of the second outboard sealing tooth 56. Further, additional sealing teeth inboard of the first main sealing tooth 54, may be positioned in this and other embodiments.

The coupling body 50 includes an exterior surface 60. Exterior surface 60 includes a first tooth urging feature or first projection 62 and a second tooth urging feature or second projection 64 and a flange or swage ring stop 66.

In a preferred embodiment, first projection 62 is located above and opposite the first main sealing tooth 54. As can be seen in FIG. 4 the first projection 62 includes an abrupt upslope ramp 68, a plateau 70, and a fairly gradual downslope ramp 72. This arrangement is generally referred to a reverse taper. The plateau 70 is located immediately adjacent the first main sealing tooth 54 with the downslope ramp 72 continuing from the first main sealing tooth 54 toward the swage ring stop 66. The second projection 64 begins with a gradual upslope ramp 74 which begins at end 76 of the coupling body 50 and is substantially positioned opposite the second outboard sealing tooth 56. Ramp 74 leads to a plateau 78 which continues to the upslope ramp 68 of the first protrusion 62.

When the portion of the coupling body 50 depicted in FIG. 4 is rotated about axis of rotation 80, one end of the coupling body 50 is described.

The swage ring 52 includes a swage body 82 which has an interior surface 84 and an exterior surface 86. The full shape of swage ring 52 is generated by rotating the cross-sectional portion shown in FIG. 4 about axis of rotation 92. Swage body 82 further includes an inboard end 88 and outboard end 90. Inboard end 88 butts against swage ring stop 66 when the swage ring 52 is received in a final installation position on coupling body 50 as will be more fully described with respect to FIG. 7. In this fully installed position the outboard end 90 of the swage ring 52 is positioned adjacent the end 76 of the coupling body 50.

The interior surface 84 of the swage ring 52 describes a first ramp 94 which begins at inboard end 88 and proceeds to a first land 96. First land 96 is substantially parallel in a preferred embodiment to axis of rotation 92. Following the first land 96 is a second ramp 98. Second ramp 98 is smaller in comparison to the first ramp 94 and the next proceeding ramp described below. Following second ramp 98 is a second land 100 which is also substantially parallel in a preferred embodiment to the axis of rotation 92. Ramp 98 and land 100 describes the kickdown device 101 of the invention as will be more fully discussed hereinbelow. Following the second land 100 is a third ramp 102. A third land 104 joins the third ramp 102 with the outboard end 90. The third land 104 is also substantially parallel to the axis of rotation 92 in a preferred embodiment. As is evident in FIG. 4, the radial distance between the first land 96 and the axis of rotation 92 is larger than the radial distance between the second land 100 and the axis of rotation 92. Further the radial distance between the second land 100 and the axis of rotation 92 is larger than the radial distance between the third land 104 and the axis of rotation 92. Accordingly, the internal diameter of the land 100 which comprises a portion of the kickdown device 101 is reduced in comparison to the internal diameter of the land 96. It is also noted that along the direction of installation of the swage ring 52 onto the coupling body 50, that the kickdown device 101 is located between the first ramp 94 and the third ramp 102.

As will become more evident in the discussion of the remaining figures, the first land 96 engages the first projection 62 prior to the engagement of the third ramp 102 with the second projection 64 of the coupling body 50. Further, it is evident in this embodiment that as the beginning of the second land 100 immediately adjacent the second ramp 98 engages the first projection 62 of the coupling body, that the third land 104 immediately adjacent the ramp 102 engages the second projection 64. In other words, the spacing between the beginning of the second land 100 immediately adjacent the second ramp 98 to the beginning of the third land 104 immediately adjacent to the third ramp 102 is substantially equal to the spacing between the first and second projections and thus the spacing between the first main sealing tooth and the second outboard sealing tooth. With this arrangement the kickdown device 101 acts substantially simultaneously to place an additional load on the main sealing tooth 54 as the third ramp 102 and third land 104 act to place a load on the second outboard sealing tooth 56. Alternatively, with the beginning of second ramp 98 deferred so that ramp 98 is closer to outboard end 90 and thus with land 100 shorter, the action of the kickdown device 101 in placing an additional load on the first main sealing tooth 54 and the pipe occur subsequent to the second outboard sealing tooth 56 biting into the pipe.

By way of example only, in a preferred embodiment the difference between the radial distance from the axis of rotation 92 and the first land 96 compared to the radial distance from the axis of rotation 92 and the second land 100 is preferably in the range of 0.01 to 0.005 inches compared to a radial distance from the axis of rotation 92 to the second land 100 of 1.26 inches. Thus it is evident that the kickdown device 101 is a subtle variation on the interior surface of the swage ring 52. It is to be understood that the dimensions and values for the kickdown device can be outside the above range and be within the spirit and scope of the invention.

Figure 5:
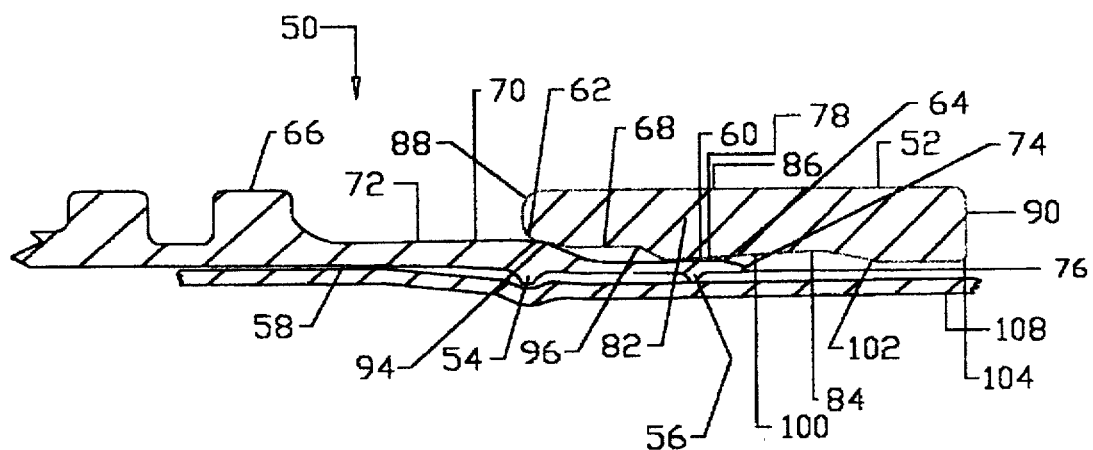
FIG. 5 is a cross-sectional view of the swage ring of FIG. 4 pre-assembled onto a cross-sectional view of a coupling body and shown in association with a cross-section of a pipe.
Figure 6:
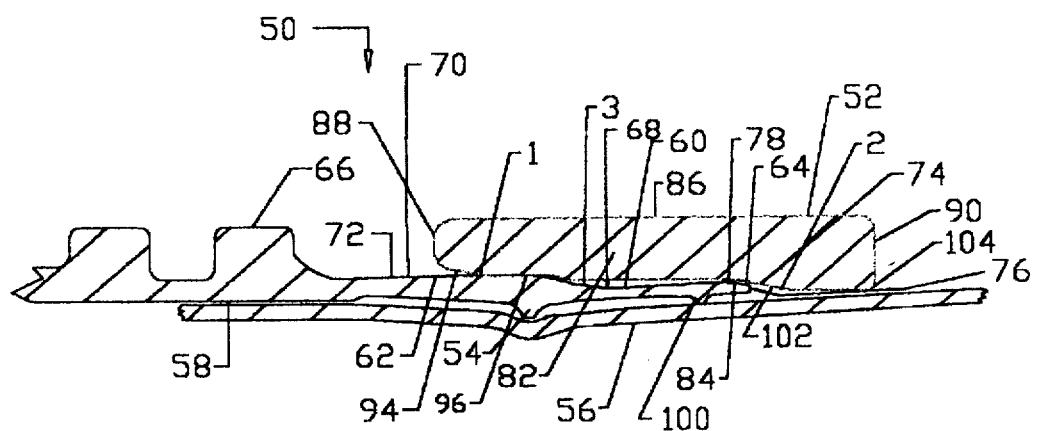
FIG. 6 is a cross-sectional view similar to FIG. 5, except with the swage ring is urged further onto the coupling body such that the first sealing tooth of the coupling body engages the pipe.
Figure 7:
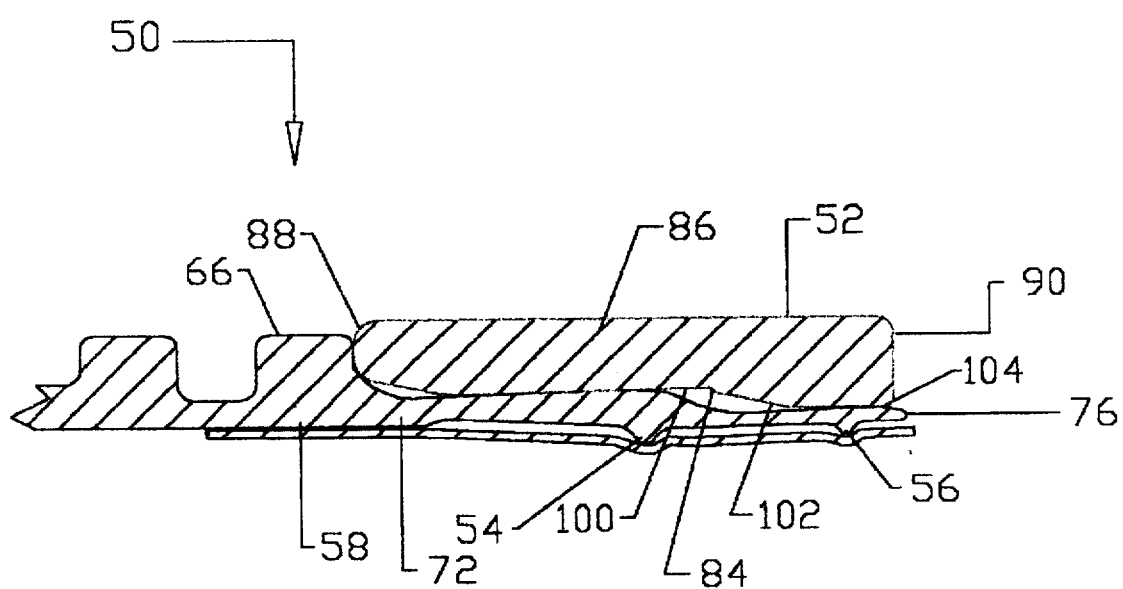
FIG. 7 is a view similar to FIG. 6, except that the swage ring is fully received on the coupling body so that the installation of the pipe fitting on the pipe is completed.

Turning to FIGS. 5, 6 and 7, the method of installation of the swage ring on the coupling body 50 and the method of the invention is depicted. In FIG. 5 the swage ring 52 has been preassembled onto the coupling body 50. The pipe 108 is depicted and placed adjacent the interior surface 58 of the coupling body 50 such that the first main sealing tooth 54 and the second outboard sealing tooth 56 almost touch the pipe 108. As can be seen in FIG. 5 in the preassembled position, which is normally the position the product is shipped to the ultimate end user, the first ramp 94 of the swage ring 52 touches the first projection 62 of the coupling body 50 about at the position of the plateau 78. The second land 100 of the swage ring 52 rests upon the second plateau 78 of the coupling body 80 and is positioned essentially over the second outboard sealing tooth 56. The installation tool, such as the above referenced hydraulic installation tool, then engages the swage ring 52 in order to apply an installation force and urge the swage ring 52 to the final installation position. FIG. 6 shows that the installation of the swage ring 52 onto the coupling body 50 has been partially completed with the first main sealing tooth 54 biting into and inwardly deforming the pipe 108. As can be seen in FIG. 6 the first land 96 of the swage ring 52 has been urged over the first protrusion 62 of the coupling body 50 deforming the first protrusion 62 inwardly and causing the first main sealing tooth 54 to bite inwardly into and thus deform the pipe 108. As can be seen in FIG. 6, the reduced diameter kickdown device 101, which is described by the second ramp 98 and the second land 100, has not engaged the first protrusion 62 of the coupling body 50 and thus has not yet affected the force between the first main sealing tooth 54 and the pipe 108.

Also as can be seen in FIG. 6, the second outboard sealing tooth 56 has not yet been engaged by the third ramp 102 or the third land 104 and thus the second outboard sealing tooth 56 has not yet operatively engaged the pipe 108.

Figure 3:
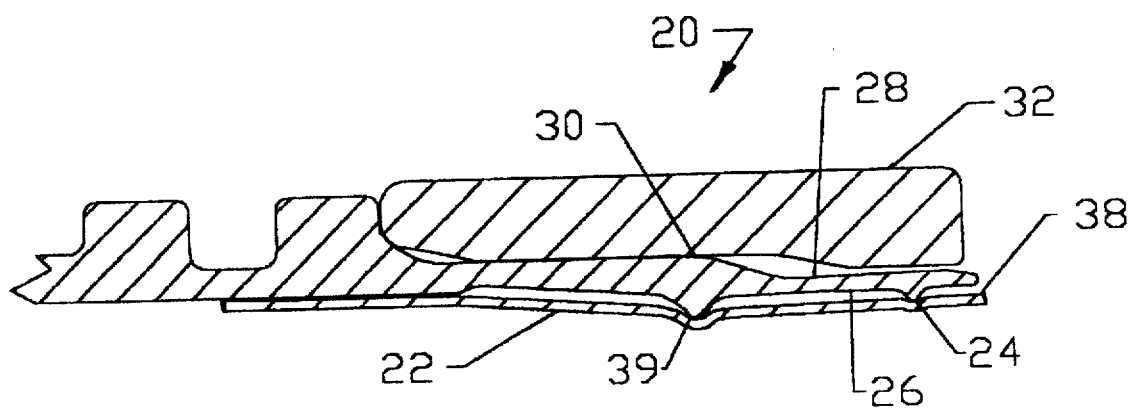
FIG. 3 is a cross-sectional view of the swage ring of FIG. 2 urged into operative contact with the coupling body of FIG. 1 in order provide a sealing arrangement about a pipe.

Proceeding to the FIG. 7 it is evident that installation of the swage ring 52 on the coupling body 50 is complete with the end 88 of the swage ring 52 butted against the swage ring stop 66. It can be seen that now both the first main sealing tooth 54 and the second outboard sealing tooth 56 are engaged with the pipe 108. As can be seen in FIG. 7, the kickdown device 101 which comprises the reduced diameter second land 100 has now engaged the first protrusion 62 and created an additional loading force between the first main sealing tooth 54 and the pipe 108 in order to eliminate any gap, as shown in FIG. 3, which may have been formed due to the pushing away of the pipe 108 by the second outboard sealing tooth 56 engaging the pipe 108.

Figure 8:
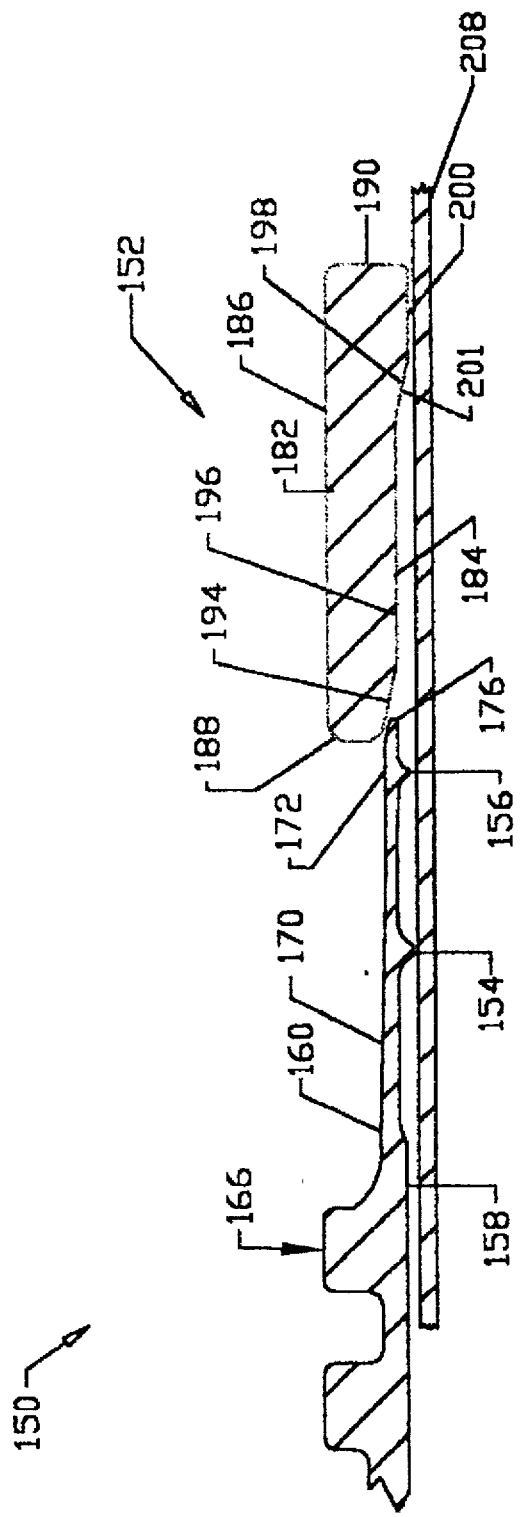
FIG. 8 is a cross-sectional view of a second embodiment of a swage ring of the invention preassembled onto a cross-sectional view of a second embodiment of a coupling body of the invention and shown in association with a cross-section of a pipe.
Figure 9:
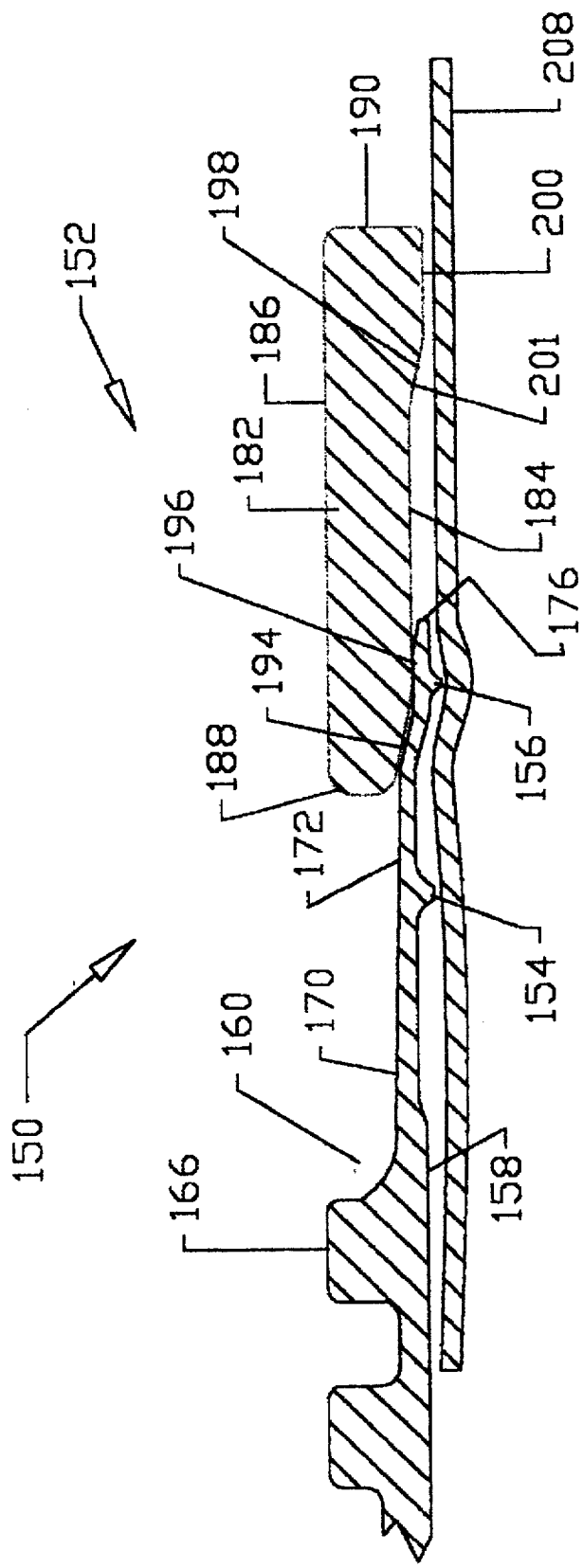
FIG. 9 is a cross-sectional view similar to FIG. 5 except that the swage ring is urged further onto the coupling body such that the first sealing tooth of the coupling body engage the pipe.
Figure 10:
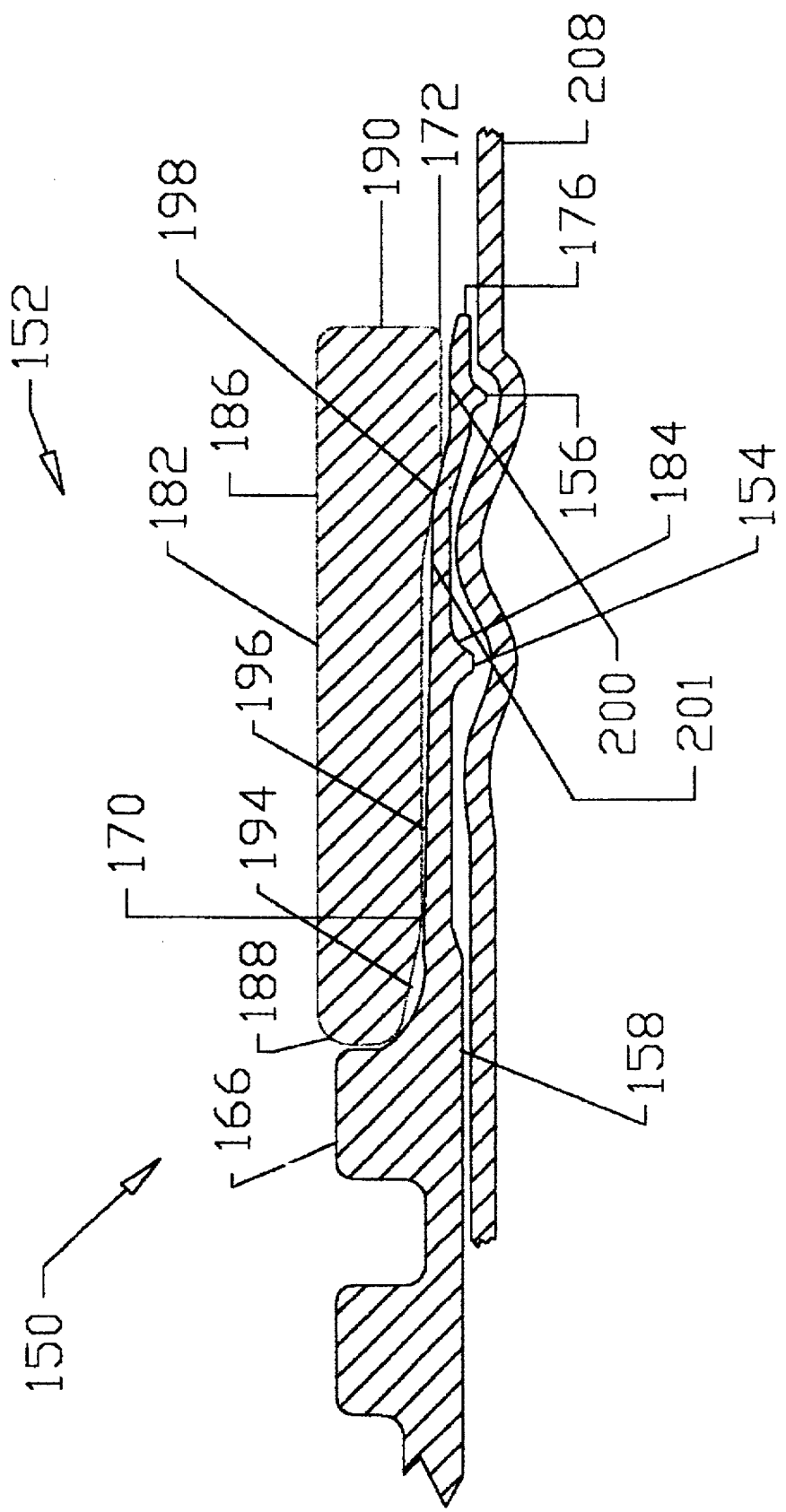
FIG. 10 is a view similar to FIG. 9, except that the swage ring is fully received on the coupling body and the installation of the pipe fitting on the pipe is completed.

A second preferred embodiment of the invention can be viewed in FIGS. 8, 9, and 10. In FIG. 8, the coupling body of the invention is designated 150 with the swage ring designated 152. The coupling body 150 includes a first main sealing tooth 154 and a second outboard sealing tooth 156. The teeth are located on the interior surface 158 of the coupling body 150. It is to be understood as is shown in the above referenced prior patents, that additional teeth may be positioned on the interior surface 158 outboard of the second outboard sealing tooth 156 and additionally inboard of the first main sealing tooth 154.

The coupling body 150 includes an exterior surface 160. The exterior surface 160 has a flange or swage ring stop 166. In addition, exterior surface 160 includes a plateau 170 and a downslope ramp 172 which leads to the end 176 of the coupling body 150.

The swage ring 152 includes a swage body 182 with an interior surface 184 and an exterior surface 186. The swage body 182 further includes an inboard end 188 and an outboard end 190. The inboard end 188 butts against the swage ring stop 166 when the swage ring 152 is received in a final installation position on the coupling body 150 as would be more fully described with respect to FIG. 10. In its fully installed position, the outboard end 190 of the swage ring 152 is positioned adjacent the end 176 of the coupling body 150.

The interior surface 184 of the swage ring 150 describes a first ramp 194 which begins at the inboard end 188 and slopes downwardly to a first land 196. Following the first land 196 is a second ramp 198. The second ramp 198 is substantially smaller compared to the first ramp 194. Following the second ramp 198 is a second land 200, which second land 200 communicates with the outboard end 190 of the swage ring 152. The second ramp 198 and the second land 200 describe the kickdown device 201 of the invention as will be more fully described hereinbelow.

Preferably the dimensions of the kickdown device 201 relative to the rest of the swage ring 152 is as specified with respect to the prior inventive kickdown device 101 discussed hereinabove.

With respect to FIGS. 8, 9 and 10, the method of installation of the swage ring 152 on the coupling body 150 is depicted. In FIG. 8, the swage ring 150 has been preassembled onto the coupling body 152. The pipe 208 is depicted in place adjacent to the interior surface 158 of the coupling body 150 such that the first main sealing tooth 154 and the second outboard sealing tooth 156 almost touch the pipe 208. As can be seen in FIG. 8 in the preassembled position, which is normally the position the product is shipped to the ultimate end user, the first ramp 194 of the swage ring 152 touches the downslope ramp 172 and the end 176 of the coupling body 150.

FIG. 9 shows that the installation of the swage ring 152 onto the coupling body 150 has been partially completed with the second outboard sealing tooth 156 biting into and inwardly deforming the pipe 208. As can be seen in FIG. 9 the first land 196 of the swage ring 152 has been urged over the exterior surface 160 and in particular of the plateau 170 of the coupling body 150 deforming the coupling body 150 and causing the second outboard sealing tooth 150 to bite inwardly into and thus deform the pipe 208. In FIG. 9, the reduced diameter kickdown device 201, which is described by the second ramp 198 and the reduced diameter second land 200, has not engaged the coupling body 150 and thus has not yet affected the force between the second outboard sealing tooth 156 and the pipe 208.

Proceeding to FIG. 10, it is evident that the installation of the swage ring 152 on the coupling body 150 is completed with the end 188 of the swage ring 152 butted against the swage ring stop 166. Both the first main sealing tooth 154 and a second outboard sealing tooth 156 are engaged with the pipe 208. In FIG. 10, kickdown device 201 has now engaged the exterior surface 160 and in particular the plateau 170 of the coupling body 150 and created an additional loading force between the second outboard sealing tooth 156 and the pipe 208 in order to eliminate any gaps that may have been formed due to the pushing away of the pipe 208 by the first main sealing tooth 154 engaging the pipe 208. Thus, the kickdown device 201 restores any loading force between the second outboard sealing tooth 156 and the pipe 208 which may have been reduced due to the engagement of the main sealing tooth 154 with the pipe 208. It is to be understood that the kickdown device 201 can operatively engage the second outboard sealing tooth 156 one of (1) substantially simultaneously with the operative engagement of the swage ring and the first main sealing tooth 154, or (2) subsequent to the engagement of the swage ring with the first main sealing tooth 154.

Industrial Applicability

As is evident from the above, the present invention allows for sequential engagement of the sealing teeth with the pipe with only a slight increase in installation force when the kickdown device 101 of the present invention causes the first tooth to bite into the pipe simultaneous with the biting into the pipe by the second sealing tooth. Alternatively, the kickdown device 101 and particularly the second ramp 98 can be moved closer to the third ramp 102 decreasing the length of the second land 100 along the axis of rotation 92. This change has the effect of delaying the operation of the kickdown device 101 on the first protrusion 62 and thus the first main sealing tooth 54 so that the first main sealing tooth 54 will add additional load onto the pipe after the second outboard sealing tooth 56 has engaged the pipe 108.

The above invention thus cures any gap or reduction in force which might occur between the first main sealing tooth 54 and the pipe 108 due to radial pipe deformation caused by the engagement of the second outboard sealing tooth 56 with the pipe.

Further as is evident from the above the second embodiment restores any reduction in force which may occur between the second outboard tooth 154 and the pipe 208 due to pipe deformation caused by the engagement of the first main sealing tooth 154 with the pipe. In addition the second embodiment has all the advantages of the first embodiment.

It is to be noted that the spacing between the first ramp 194 and the second ramp 196 on the swage ring 152 affects the sequence of engaging of the teeth with the pipe. Thus, by increasing the distance between these ramps, sequence can be changed from one of having the main sealing tooth engage the pipe simultaneous with the second engagement of the pipe by the second outboard sealing tooth 156 as caused by the kickdown device 208, to a situation where the kickdown device 208 operatively engages the second outboard sealing tooth 156 subsequent to the engagement of the pipe by the first main sealing tooth 154.

Other objects, aspects, features and advantages of the present invention can be obtained from a review of the figures and the claims.

It is to be understood that other embodiments of the present invention can be constructed and fall within the spirit and scope of the appended claims.

We claim:

1. An apparatus for making pipe connections with a pipe comprising:

a coupling body with a first surface adapted for receiving a pipe;

a swage ring which is urgeable relative to the coupling body in order to cause at least part, of the first surface to engage the pipe to create a seal;

said first surface of the coupling body having a first tooth for substantially biting into the pipe as said swage ring is urged relative to the coupling body;

said first surface having a second tooth for making at least a minimal bite into the pipe as said swage ring is urged relative to the coupling body;

said swage ring having a first portion for causing the first tooth to bite into the pipe and a second portion for causing the second tooth to bite into the pipe, wherein the first portion is spaced from the second portion so that the second tooth bites into the pipe subsequent to when the first tooth bites into the pipe;

said swage ring having a third portion for causing the first tooth to additionally bite into the pipe, one of (1) substantially simultaneously with the biting into the pipe by the second tooth or (2) subsequent to the biting into the pipe by the second tooth;

said coupling body having a second surface, with fourth and fifth portions, against which said swage ring contacts as said swage ring is urged relative to said coupling body;

said coupling body having said fourth portion located in association with the first tooth such that as said first portion of the swage ring is urged against said fourth portion of said coupling body said first tooth bites into the pipe in order to create a seal; and said coupling body having said fifth portion located in association with the second tooth such that as said second portion of the swage ring is urged against said fifth portion of said coupling body said second tooth bites into the pipe.

2. The apparatus of claim 1 including:

said swage ring having a longitudinal axis;

said first portion of said swage ring located further away from the longitudinal axis than said third portion of said swage ring; and said third portion of said swage ring located further away from the longitudinal axis than said second portion.

3. The apparatus of claim 2 wherein:

said first, second, and third portions of said swage ring comprise ramps, with the first and second portions connected with a land, and said second and third portions connected by a land.

4. The apparatus of claim 1 including:

said swage ring having a longitudinal axis; and said third portion of said swage ring is located between the first and second portions in a direction along said longitudinal axis.

5. The apparatus of claim 1 wherein: said first tooth is a main sealing tooth and said second tooth is a second sealing tooth located outboard from the main sealing tooth.

6. The apparatus of claim 1 wherein:

said fourth and said fifth portions protrude from the second surface.

7. The apparatus of claim 6 wherein:

said fourth portion comprises a reverse taper.

8. The apparatus of claim 1 wherein:

said fourth and said fifth portions comprise ramps which slope upwardly in the direction that said swage ring is urgeable relative to said coupling body.

9. The apparatus of claim 1 wherein:

said the first, second and third portion of the swage ring comprise ramps that slope downwardly in the direction away from the direction that said swage ring is urgeable relative to the coupling body.

10. The apparatus of claim 1 wherein:

the distance between the first tooth and the second tooth is one of less than and about equal to the distance between the second portion and the third portion of the swage ring.

11. A swage ring and coupling body system for making a pipe connection comprising:

a swage ring and a coupling body;

said coupling body having an inner surface for receiving a pipe, wherein the inner surface defines a first sealing tooth and a second sealing tooth, and an outer surface over which the swage ring is received;

said swage ring having a first portion that operatively engages the outer surface of the coupling body opposite said first sealing tooth of said coupling body and causes the first sealing tooth to bite into the pipe;

said swage ring having a second portion that operatively engages the outer surface of the coupling body opposite said second sealing tooth of said coupling body and causes the second sealing tooth to bite into the pipe; and said swage ring having a third portion that operatively engages the outer surface of the coupling body opposite the first sealing tooth and causes the first sealing tooth to restore a load force between the first tooth and the pipe, which was lost when the second portion caused the second sealing tooth to bite into the pipe.

12. The swage ring of claim 11 wherein:

said third portion causes the first sealing tooth to advance toward and bite into the pipe should the action of the second portion have pushed the pipe away from the first sealing tooth.

13. The swage ring of claim 11 wherein:

said first, second and third portions are first, second and third ramps, respectively, with the third ramp located between the first ramp and the second ramp.

14. A swage ring and coupling body system for making a pipe connection comprising:

a swage ring and a coupling body;

said coupling body having an inner surface for receiving a pipe, wherein the inner surface defines a first sealing tooth and a second sealing tooth, and an outer surface over which the swage ring is received;

said swage ring having a first portion that operatively engages the outer surface of the coupling body opposite said first sealing tooth of said coupling body and causes the first sealing tooth to bite into the pipe;

said swage ring having a second portion that operatively engages the outer surface of the coupling body opposite said second sealing tooth of said coupling body and causes the second sealing tooth to bite into the pipe; and said swage ring having a third portion that operatively engages the outer surface of the coupling body opposite the first sealing tooth and causes the first seating tooth to close a gap between the first sealing tooth and the pipe, which gap was caused when the second portion caused the second sealing tooth to bit bite into the pipe and push the pipe away from the first sealing tooth.

15. The swage ring of claim 14 wherein:

said first, second and third portions are first, second and third ramps, respectively, with the third ramp located between the first ramp and the second ramp.

16. An apparatus for making pipe connections with a pipe comprising:

a coupling body with a first surface adapted for receiving a pipe;

a swage ring which is urgeable relative to the coupling body in order to cause at least part of the first surface to engage the pipe to create a seal;

said coupling body with a second surface that receives said swage ring;

said first surface of the coupling body having a first tooth that substantially bites into the pipe as said swage ring is urged relative to the pipe;

said first surface of the coupling body having a second tooth that makes at least a minimal bite into the pipe as said swage ring is urged relative to the pipe;

said swage ring having a first portion that causes the first tooth to bite into the pipe and a second portion that causes the second tooth to bite into the pipe, wherein the first portion is spaced from the second portion so that the second tooth bites into the pipe subsequent to when the first tooth bites into the pipe;

said swage ring having a third portion that causes the first tooth to additionally bite into the pipe, substantially simultaneously with the biting into the pipe by the second tooth;

said second surface of said coupling body having a fourth portion associated with the first tooth and a fifth portion associated with the second tooth; and wherein said first portion and then subsequent the third portion of the swage ring engage the fourth portion of the coupling body and said second portion of the swage ring engage the fifth portion of the coupling body in order to make pipe connections.

17. An apparatus for making pipe connections with a pipe comprising:

a coupling body with a first surface adapted for receiving a pipe;

a swage ring which is urgeable relative to the coupling body in order to cause at least part of the first surface to engage the pipe to create a seal;

said coupling body with a second surface that receives said swage ring;

said first surface of the coupling body having a first tooth that substantially bites into the pipe as said swage ring is urged relative to the pipe;

said first surface of the coupling body having a second tooth that makes at least a minimal bite into the pipe as said swage ring is urged relative to the pipe;

said swage ring having a first portion that causes the first tooth to bite into the pipe and a second portion that causes the second tooth to bite into the pipe, wherein the first portion is spaced from the second portion so that the second tooth bites into the pipe subsequent to when the first tooth bites into the pipe;

said swage ring having a third portion waiting with sail record surface that causes the first tooth to additionally bite into the pipe, subsequent with the biting into the pipe by the second tooth;

said second surface of said coupling body having a fourth portion associated with the first tooth and a fifth portion associated with the second tooth; and wherein said first portion and then subsequent the third portion of the swage ring engage the fourth portion of the coupling body and said second portion of the swage ring engage the fifth portion of the coupling body in order to make pipe connections.

* * * * *

UNITED STATES PATENT AND TRADEMARK OFFICE
CERTIFICATE OF CORRECTION

PATENT NO. : 5,709,418
DATED : January 20, 1998
INVENTOR(S) : Robert W. Benson, et al.

It is certified that error appears in the above-indentified patent and that said Letters Patent is hereby corrected as shown below:

In the Claims

Column 14, lines 1-2: after "portion" and before "that causes" delete "waiting with sail record surface"

Signed and Sealed this

Thirty-first Day of March, 1998

Attest:

BRUCE LEHMAN

Attesting Officer    Commissioner of Patents and Trademarks